US010508507B2

(12) United States Patent
Rios

(10) Patent No.: US 10,508,507 B2
(45) Date of Patent: Dec. 17, 2019

(54) TUBULAR TRANSFER SYSTEM WITH VARIABLE PRESENTATION HEIGHT AND PRESENTATION ANGLE

(71) Applicant: FORUM US, INC., Houston, TX (US)

(72) Inventor: Rogelio Rios, Spring, TX (US)

(73) Assignee: FORUM US, INC., Houston, TX (US)

(*) Notice: Subject to any disclaimer, the term of this patent is extended or adjusted under 35 U.S.C. 154(b) by 0 days.

(21) Appl. No.: 15/813,417

(22) Filed: Nov. 15, 2017

(65) Prior Publication Data

US 2019/0145192 A1 May 16, 2019

(51) Int. Cl.
| | |
|---|---|
| *B65G 41/00* | (2006.01) |
| *E21B 19/15* | (2006.01) |
| *E21B 15/00* | (2006.01) |
| *E21B 19/08* | (2006.01) |
| *B66F 7/06* | (2006.01) |
| *E21B 19/14* | (2006.01) |

(52) U.S. Cl.
CPC .......... *E21B 19/155* (2013.01); *B65G 41/002* (2013.01); *B65G 41/005* (2013.01); *B66F 7/06* (2013.01); *E21B 15/003* (2013.01); *E21B 19/08* (2013.01); *E21B 19/14* (2013.01)

(58) Field of Classification Search
CPC ........ B66F 7/08; B66F 7/0625; B66F 7/0691; E21B 7/025; E21B 19/155; E21B 7/022; Y10T 74/20594
See application file for complete search history.

(56) References Cited

U.S. PATENT DOCUMENTS

| | | | | |
|---|---|---|---|---|
| 2,471,901 | A | * | 5/1949 | Ross ..................... B66F 7/0625 182/16 |
| 2,577,926 | A | * | 12/1951 | Stiles ..................... B65G 23/44 198/313 |
| 3,259,255 | A | * | 7/1966 | Cresci ..................... B60P 1/02 254/3 R |
| 3,306,374 | A | * | 2/1967 | Stromnes ................ E21B 7/025 173/193 |
| 3,931,895 | A | * | 1/1976 | Grimaldo .................. B60P 3/07 414/678 |
| 4,274,494 | A | * | 6/1981 | Bergstrom ................ E21B 7/02 173/193 |
| 4,386,883 | A | | 6/1983 | Hogan et al. |
| 4,410,049 | A | * | 10/1983 | Molin ..................... E21B 7/022 173/193 |
| 4,552,498 | A | | 11/1985 | Dysarz |

(Continued)

FOREIGN PATENT DOCUMENTS

EP 1502000 A1 2/2005

OTHER PUBLICATIONS

PCT International Search Report/Written Opinion dated Feb. 1, 2019 for Application No. PCT/2018US059428.

*Primary Examiner* — Gregory W Adams
(74) *Attorney, Agent, or Firm* — Patterson + Sheridan, LLP

(57) ABSTRACT

A tubular transfer system is disclosed which includes a trough coupled between a pair of lifting apparatus, a base member coupled to each of the pair of lifting apparatus, a first adjustment device disposed on the pair of lifting apparatus for adjusting a presentation angle of the trough, and a second adjustment device coupled to the base member and a portion of each of the pair of lifting apparatus for adjusting a presentation height of the trough.

17 Claims, 9 Drawing Sheets

(56) References Cited

U.S. PATENT DOCUMENTS

| | | | | |
|---|---|---|---|---|
| 4,657,111 | A | * | 4/1987 | Tremblay ................... B63C 5/02 |
| | | | | 182/141 |
| 4,684,314 | A | * | 8/1987 | Luth ....................... B60P 1/025 |
| | | | | 104/45 |
| 5,485,763 | A | * | 1/1996 | Pincus ...................... A47C 3/02 |
| | | | | 248/370 |
| 6,079,925 | A | | 6/2000 | Morgan et al. |
| 7,303,181 | B1 | * | 12/2007 | Nymann .............. B25H 1/0007 |
| | | | | 254/2 B |
| 8,016,536 | B2 | | 9/2011 | Gerber et al. |
| 8,764,368 | B2 | | 7/2014 | Crossley et al. |
| 8,840,352 | B2 | | 9/2014 | Taggart et al. |
| 2006/0124356 | A1 | | 6/2006 | Gust et al. |
| 2008/0138174 | A1 | | 6/2008 | Hawkins |
| 2014/0030046 | A1 | * | 1/2014 | Perio .................... E21B 19/155 |
| | | | | 414/22.61 |
| 2015/0010377 | A1 | * | 1/2015 | Hilton, Jr. ............... E21B 19/14 |
| | | | | 414/22.54 |
| 2015/0328068 | A1 | * | 11/2015 | Hruschka ................ A61G 13/06 |
| | | | | 5/610 |

\* cited by examiner

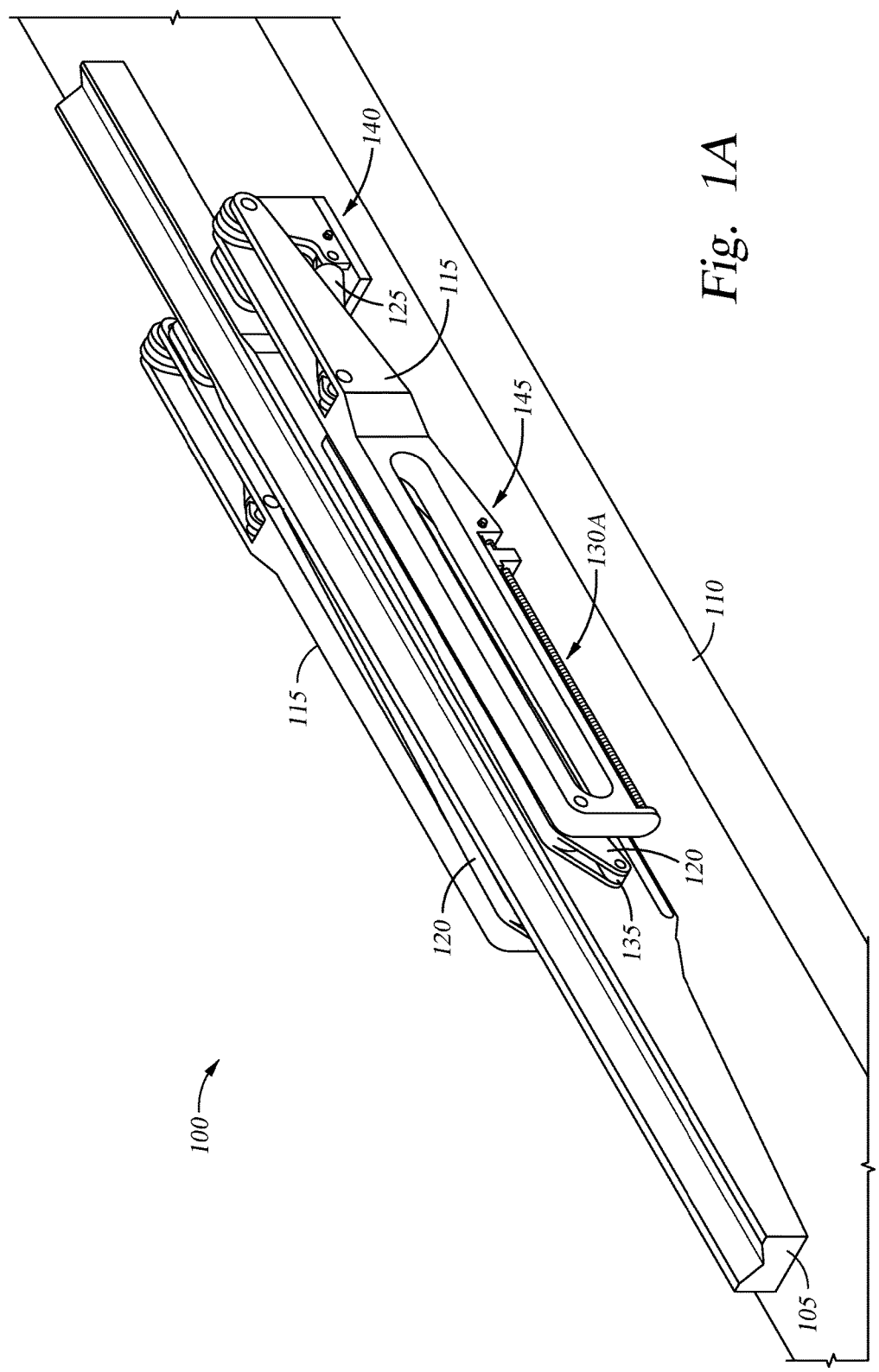

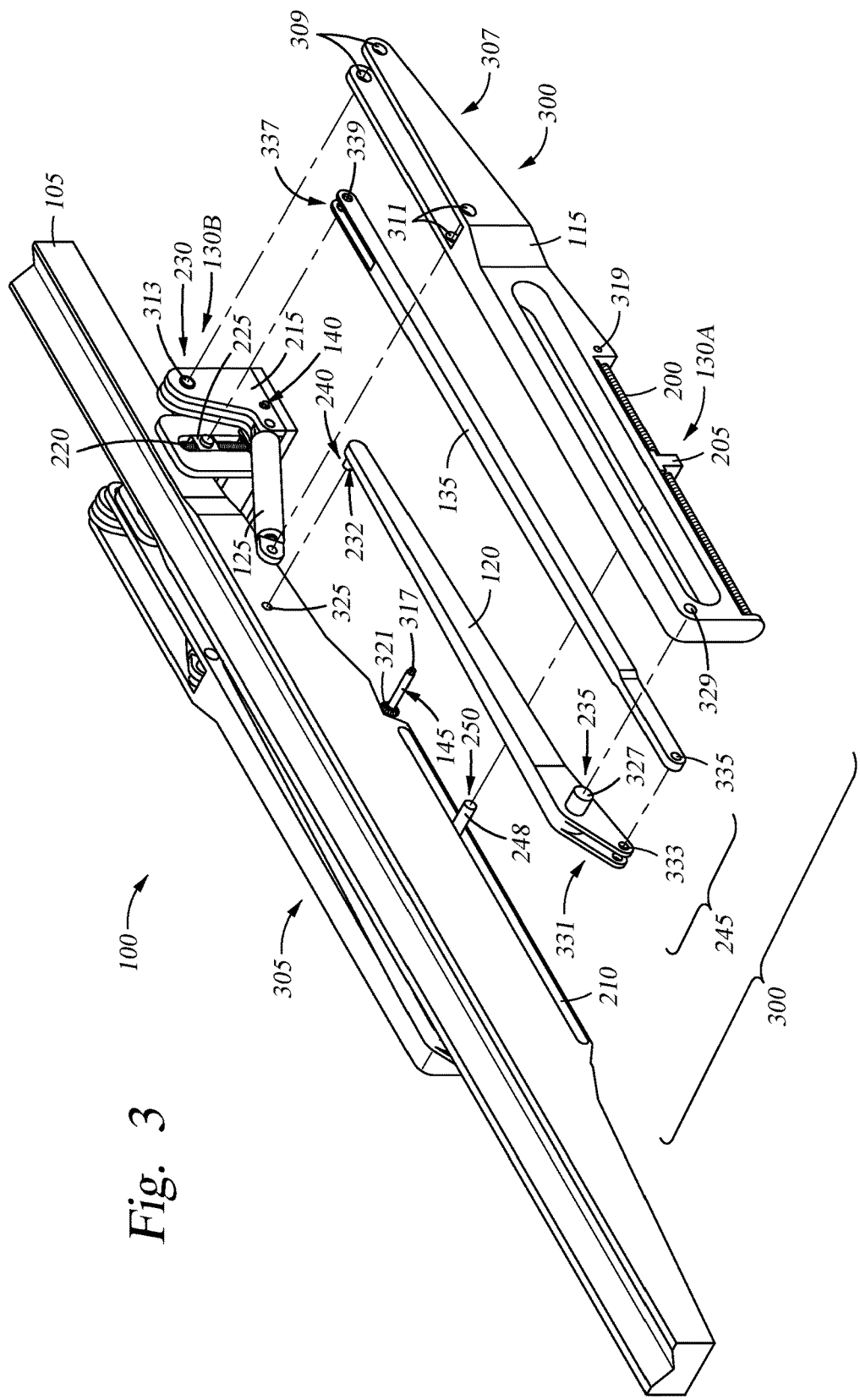

TUBULAR TRANSFER SYSTEM WITH VARIABLE PRESENTATION HEIGHT AND PRESENTATION ANGLE

BACKGROUND

Field

Embodiments of the disclosure relate to a tubular transfer system, such as a catwalk, and a method for handling tubulars at a rig site.

Description of the Related Art

Tubular transfer systems, such as catwalks, are used for presenting and receiving sections of tubulars to and from rig platforms. Since each rig platform is unique, catwalks are often designed and fabricated for use with a rig platform having a specific height or presentation angle and cannot be used with other rig platforms of different heights or presentation angles. Different catwalks have to be made for each rig platform, which is expensive and increases the inventory of catwalks that often cannot be used for any other rig.

Therefore, there exists a need for a new and/or improved catwalk designs.

SUMMARY

Embodiments of the disclosure relate to a tubular transfer system, such as a catwalk, for handling tubulars on an oil and gas rig. The catwalk as disclosed herein may be utilized with rig floors of various heights. The catwalk as disclosed herein may be adjusted to vary the presentation height, as well as the presentation angle, relative to the rig floor.

In one embodiment, a tubular transfer system is disclosed which includes a trough coupled between a pair of lifting apparatus, a base member coupled to each of the pair of lifting apparatus, a first adjustment device disposed on the pair of lifting apparatus for adjusting a presentation angle of the trough, and a second adjustment device coupled to the base member and a portion of each of the pair of lifting apparatus for adjusting a presentation height of the trough.

In another embodiment, a tubular transfer system is disclosed which includes a trough coupled between a pair of lifting apparatus, a base member coupled to each of the pair of lifting apparatus, a first adjustment device disposed on the pair of lifting apparatus for adjusting a presentation angle of the trough, and a second adjustment device coupled to the base member and a portion of each of the pair of lifting apparatus for adjusting a presentation height of the trough, wherein the presentation height of the trough is adjustable within a range of about 10 feet, and the presentation angle of the trough is adjustable within a range of about 12 degrees.

In another embodiment, a method for adjusting a tubular transfer system is disclosed. The method includes locating a catwalk having a movable trough at a position adjacent to a rig floor, adjusting a presentation height and a presentation angle of the trough while the catwalk is in a stowed position, wherein adjusting the presentation height and the presentation angle comprises rotating an adjustment rod coupled to a lifting apparatus that moves the trough, and energizing an actuator coupled to the lifting apparatus to move the trough from a stowed position to a deployed position.

BRIEF DESCRIPTION OF THE DRAWINGS

FIG. 1A is an isometric view of a catwalk in a stowed position.

FIG. 3 is an exploded view of a portion of the catwalk.

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the disclosure relate to a tubular transfer system, such as a catwalk, for handling tubulars on an oil and gas rig. The catwalk as disclosed herein may be utilized with rig floors of various heights. The catwalk as disclosed herein may be adjusted to vary the presentation height, as well as the presentation angle, relative to the rig floor.

Figure 1B:
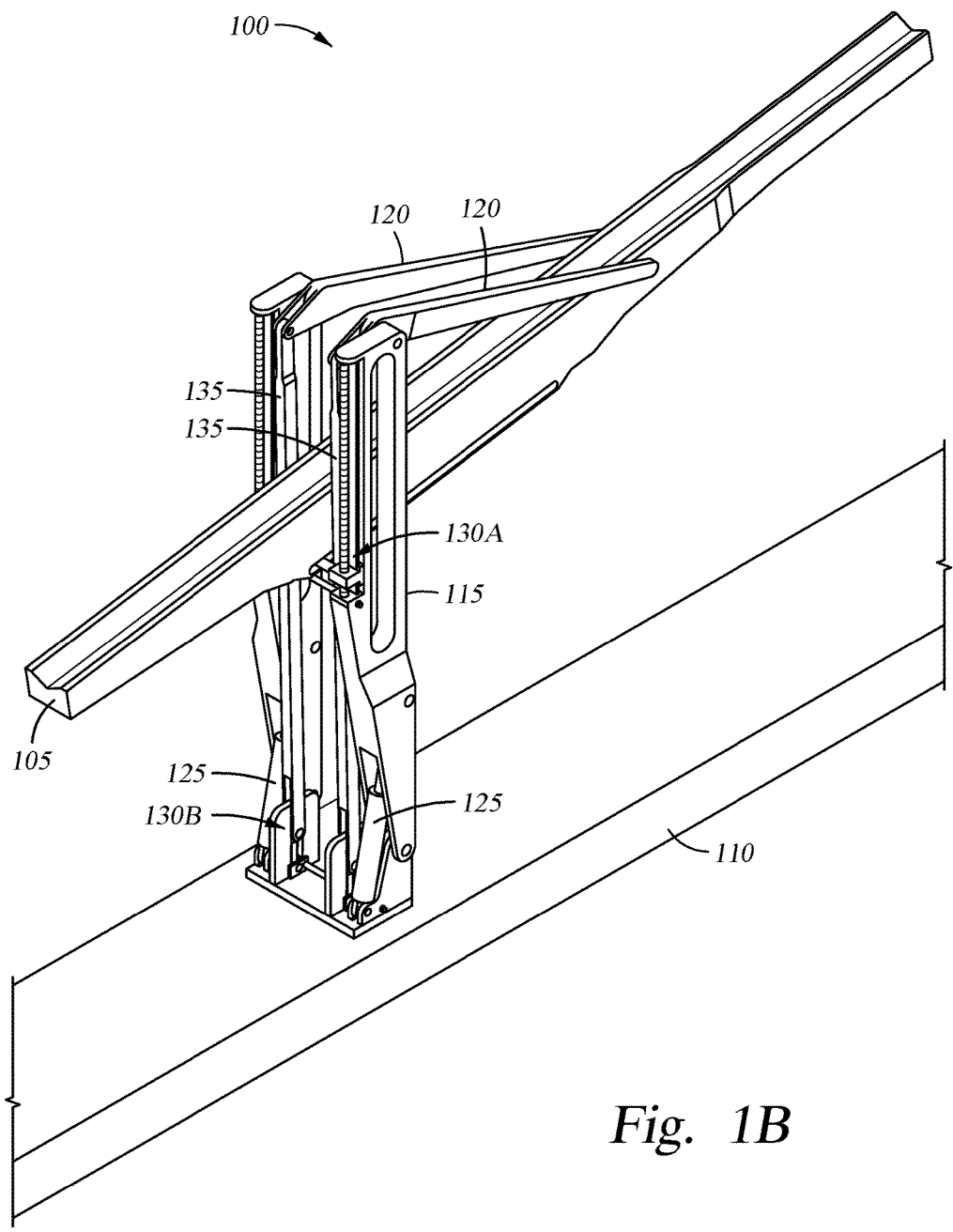
FIG. 1B is an isometric view of the catwalk in a deployed position.
Figure 1C:
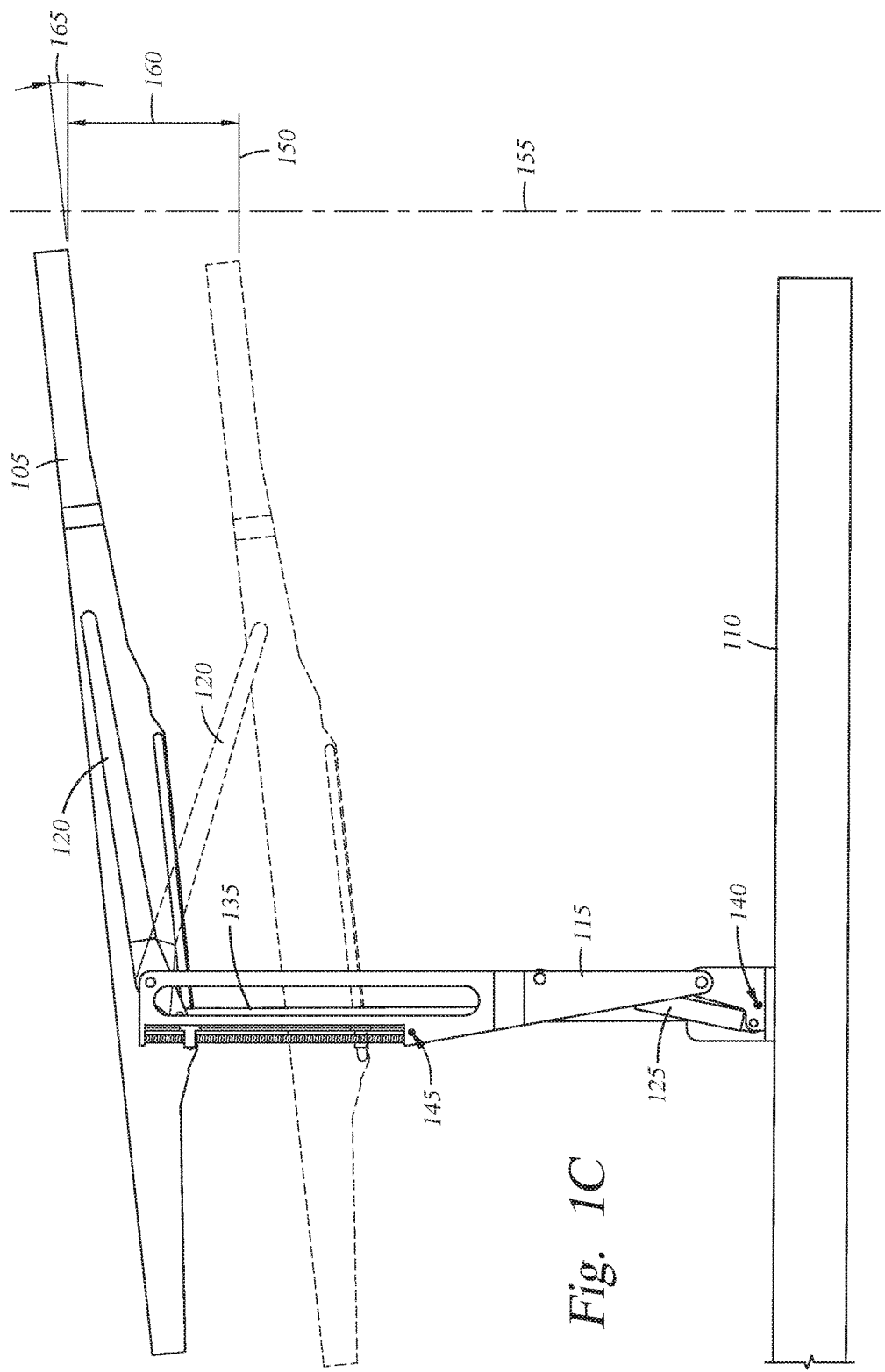
FIG. 1C is an elevation view of the catwalk showing a range of presentation heights and presentation angles.

FIG. 1A is an isometric view of a catwalk 100 in a stowed position. FIG. 1B is an isometric view of the catwalk 100 in a deployed position. FIG. 1C is an elevation view of the catwalk 100 showing a range of presentation heights and presentation angles at which the catwalk 100 can present tubulars to a rig floor.

The catwalk 100 includes a trough 105 where a tubular is to be positioned for transfer to and from a rig floor. The trough 105 of the catwalk 100 is supported by a base 110. The catwalk 100 includes two main or first arms 115 positioned on each side of the trough 105. A pair of linking or second arms 120 is provided between the trough 105 and the first arms 115. The trough 105 may be moved relative to the base 110 by an actuator 125 coupled to each of the first arms 115.

The catwalk 100 as shown in FIGS. 1A-1C may be manufactured to service different rigs floors of varying heights, and is adjustable within a range of heights such that a desirable presentation height may be achieved. Additionally, a presentation angle at which the trough 105 presents tubulars to and from the rig floor can be varied within a range such that a desired angle may be achieved.

The catwalk 100 may be manufactured in three exemplary series that correspond to a range of rig floor heights. A series 1 catwalk may be utilized for rig floor heights that range from about 20 feet to about 30 feet in height; a series 2 catwalk may be utilized for rig floor heights that range from about 30 feet to about 40 feet in height; and a series 3 catwalk may be utilized for rig floor heights that range from about 40 feet to about 50 feet in height. In addition, within each of these rig floor height ranges, the catwalk 100 presentation height and presentation angle may be adjusted. For example, the exemplary series 1 catwalk may be adjusted to service a rig floor having a height of 25 feet, or any increment between 20 feet to 30 feet. Additionally, the presentation angle may be adjusted regardless of the adjustment of presentation height. This is in contrast to conventional catwalks that are manufactured to only service a single, specific rig floor presentation height and presentation angle.

In reference to FIGS. 1A-1C, a first adjustment device 130A and a second adjustment device 130B (shown in FIG.

1B) are utilized to adjust the presentation angle and the presentation height of the catwalk 100, respectively. The second adjustment device 130B includes a pair of link members 135 that are coupled between the second arms 120 and a gear device 400 (further described in detail below with respect to FIG. 4) coupled to an adjustment rod 140 that may be rotated when the catwalk 100 is in the stowed position to adjust the presentation height of the trough 105 when in the deployed position. Likewise, the first adjustment device 130A includes a gear device 321 (further described in detail below with respect to FIG. 3) coupled to an adjustment rod 145 that may be rotated when the catwalk 100 is in the stowed position to adjust the presentation angle of the trough 105 when in the deployed position.

As schematically illustrated in FIG. 1C, a rig floor 150 and a well center 155 is shown adjacent to the catwalk 100. The presentation height of the catwalk 100 may be adjusted within an operational range 160 of about 10 feet. Additionally, the presentation angle of the catwalk 100 may be adjusted within an operational range 165 of about 12 degrees at any presentation height within the operational range 160.

Figure 2A:
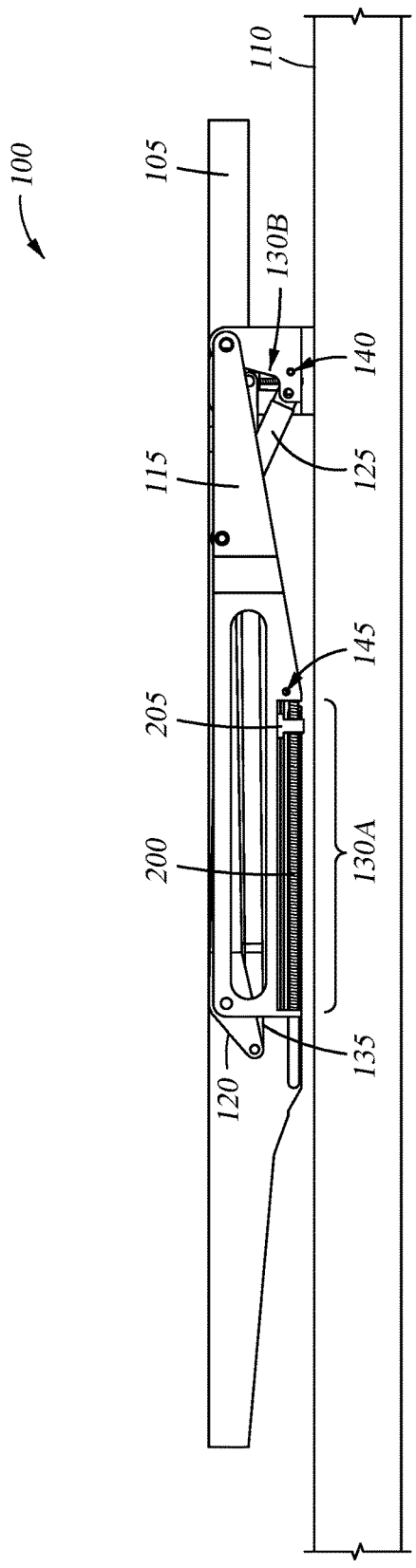
FIGS. 2A-2D are side views of the catwalk showing movement from the stowed position to the deployed position.
Figure 2B:
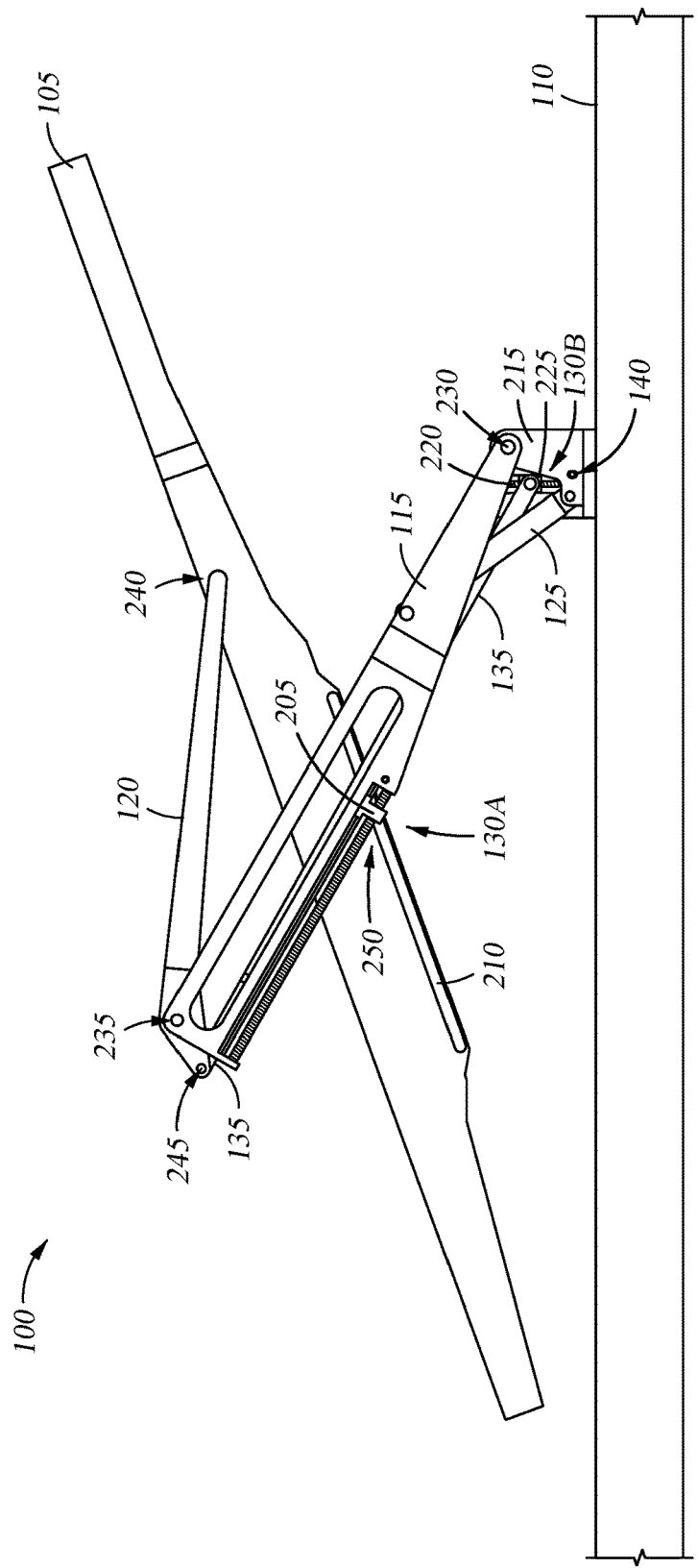
Figure 2C:
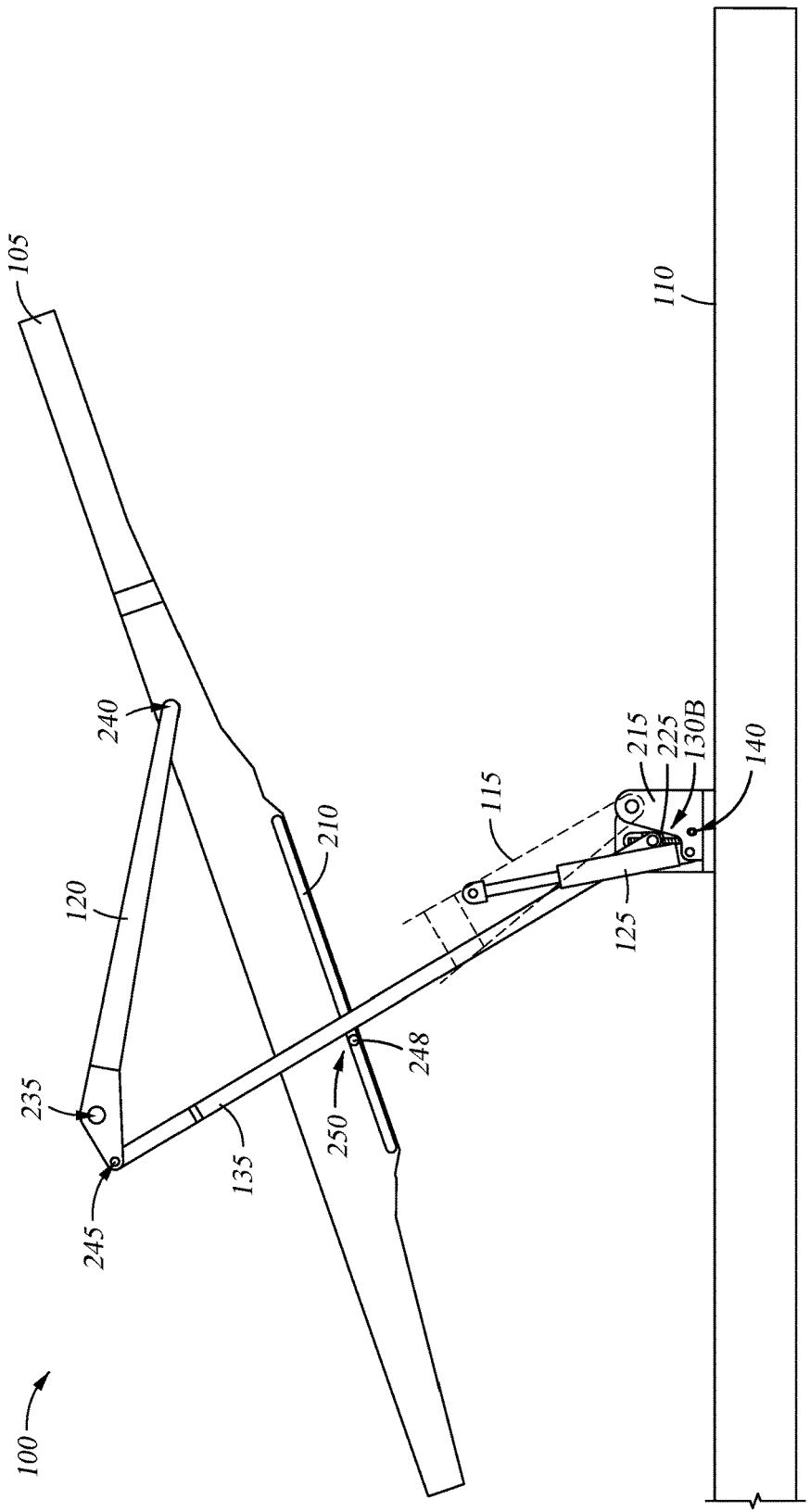
Figure 2D:
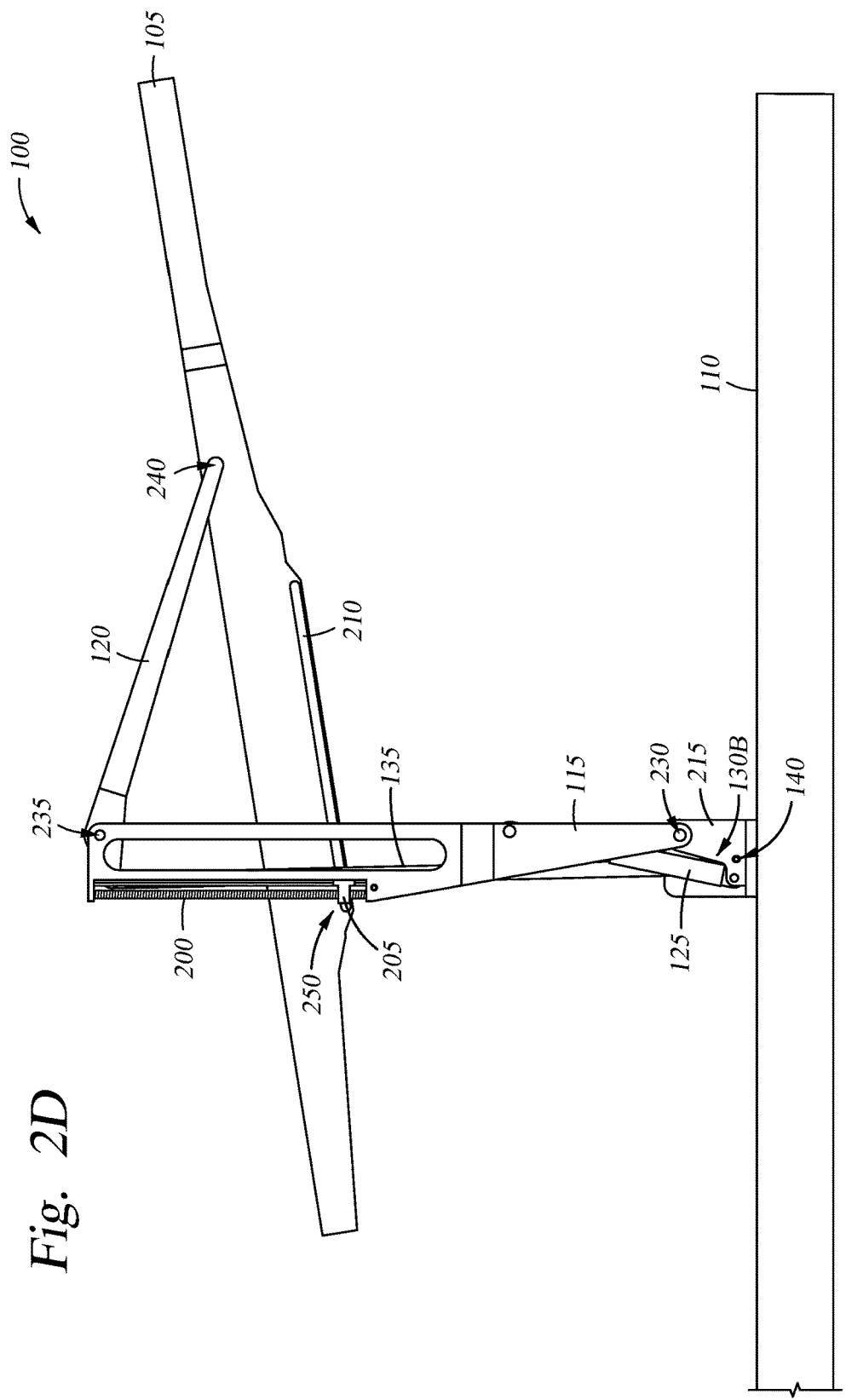

FIGS. 2A-2D are side views of the catwalk 100 showing movement from the stowed position as shown in FIG. 2A to the deployed position as shown in FIG. 2D. In FIG. 2C, a portion of the first arm 115 is not shown so as to illustrate one of the link members 135 during deployment.

In FIG. 2A, the catwalk 100 is in the stowed position. A tubular for transfer up to the rig floor is placed in the trough 105 while the catwalk 100 is in the stowed position. Alternatively, a tubular brought down from the rig floor may be transferred from the trough 105 to a storage location while the catwalk 100 is in the stowed position.

Adjustments to the presentation height and/or the presentation angle may be made while the catwalk 100 is in the stowed position as forces acting on the components of the catwalk 100 are at a minimum. Rotation of the adjustment rod 145 of the first adjustment device 130A is used to adjust the presentation angle of the trough 105. The first adjustment device 130A includes the adjustment rod 145, which is coupled to a rotatable screw 200 via a gear device 321 as shown in FIG. 3. Rotation of the adjustment rod 145 rotates the rotatable screw 200 and positions a bearing block 205 relative to a slot 210 at a base of the trough 105 as shown in FIG. 2B. While only one bearing block 205 is shown in FIGS. 2A-2D, a bearing block positioned on the other side on the opposing first arm 115 would be coupled with the bearing block 205 by a roller shaft that moves within the slot 210. Labels indicating a desired presentation angle may be placed in a location parallel to the rotatable screw 200 to assist in positioning the bearing block 205 at the position corresponding to the desired presentation angle of the trough 105 when deployed. Once the presentation angle is set, the bearing block 205 and the rotatable screw 200 are fixed relative to each other, but the bearing block 205 is allowed to move relative to the first arm 115 and the trough 105 within the slot 210 during deployment.

Figure 4:
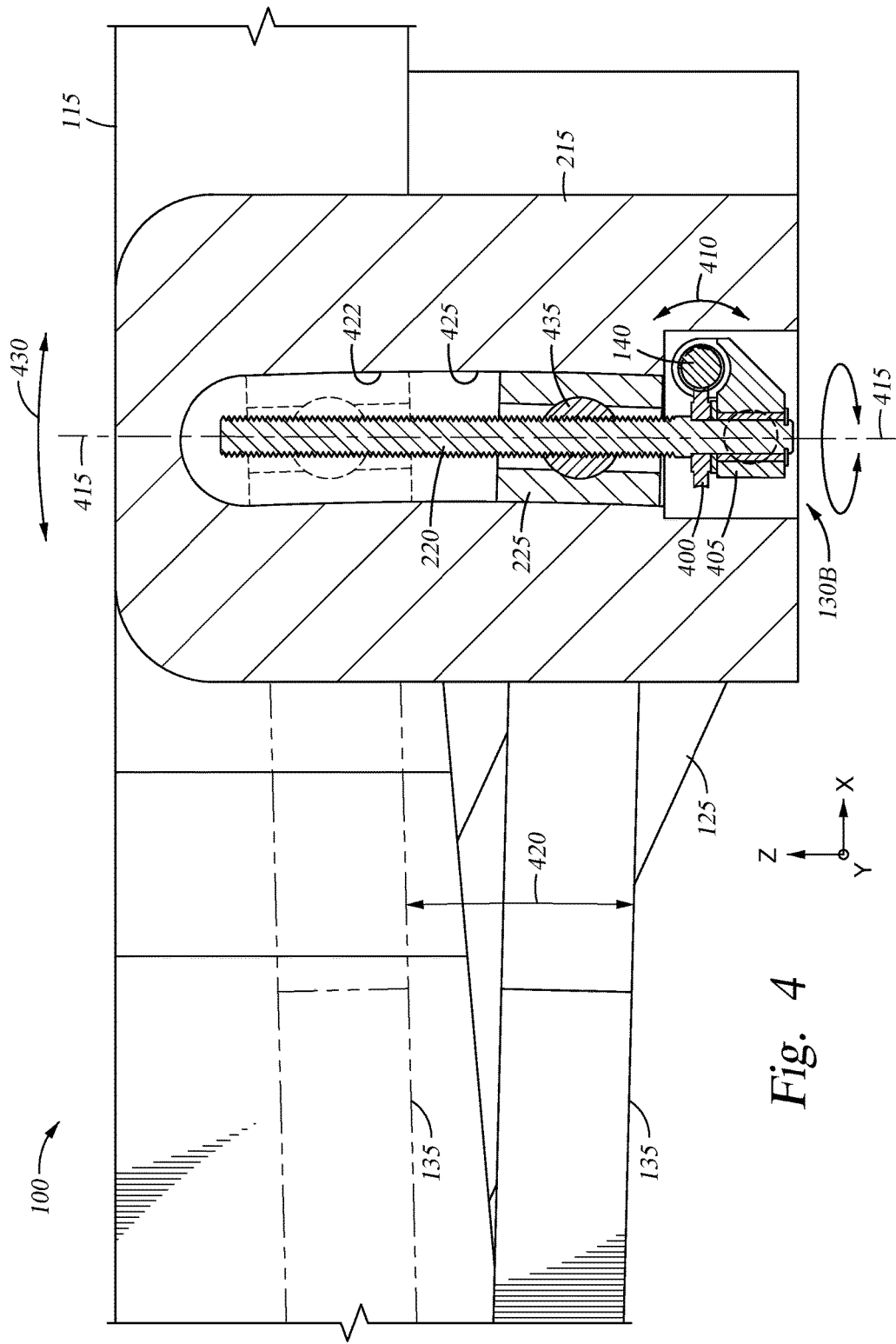
FIG. 4 is partial cross sectional view of a portion of the catwalk when in the stowed position.

In FIG. 2B, the actuators 125, coupled between a base member 215 and the first arms 115, are energized to move the first arms 115, the second arms 120, and the trough 105 from the stowed position to the deployed position. A portion of the second adjustment device 130B is shown in this position and includes the adjustment rod 140, which is coupled to a rotatable screw 220 via a gear device 400 as shown in FIG. 4. Rotation of the adjustment rod 140 of the second adjustment device 130B is used to adjust the presentation height of the trough 105. Rotation of the adjustment rod 140 rotates the rotatable screw 220 and positions a bearing block 225 relative to a slot 422 as shown in FIG. 4. The bearing block 225 is coupled to one end of a link member 135 and the other end is coupled to one of the second arms 120 as shown more clearly in FIG. 2C.

The actuators 125 are energized to rotate the first arms 115 about a first pivot point 230 which lifts the trough 105 via interaction of the second arms 120 pivoting about a second pivot point 235 between the first arms 115 and the second arms 120, and a third pivot point 240 between the second arms 120 and the trough 105. The presentation height is governed by the link members 135 coupled to the second arms 120 at a fourth pivot point 245, and the presentation angle is governed by the position of the bearing blocks 205 which are pivotably coupled to the trough 105 by the roller shaft 248 at a fifth pivot point 250.

FIG. 2D shows the catwalk 100 in the deployed position. The catwalk 100, after being adjusted in the stowed position shown in FIG. 2A, is set at a desired presentation height and in a desired presentation angle. In the deployed position, a tubular may be transferred from the trough 105 to the rig floor. Alternatively, a tubular may be transferred from the rig floor to the trough 105 while the catwalk 100 is in the deployed position.

FIG. 3 is an exploded view of a portion of the catwalk 100. A first lifting apparatus 300, which includes one of the actuators 125, first arms 115, link members 135, and second arms 120, is shown exploded from the trough 105. A second lifting apparatus 305, which includes the other actuator 125, first arm 115, link member 135, and second arm 120, is shown in the other side of the trough 105. The first lifting apparatus 300 and the second lifting apparatus 305 operate in tandem to lift and lower the trough 105. While only the operation and components of the first lifting apparatus 300 will be described, the operation and components of the first lifting apparatus 300 is the same as the operation and components of the second lifting apparatus 305.

The first arm 115 includes a yoke portion 307 having openings 309 and 311. The openings 309 are coupled to the base member 215 by a pin 313, and the openings 311 are similarly coupled to the actuator 125 by another pin. The first arm 115 also includes a portion of the first adjustment device 130A, such as the rotatable screw 200 and the bearing block 205. The bearing block 205 couples to the roller shaft 248 that is also coupled to a bearing block 205 of the second lifting apparatus 305 through the slot 210. A tool interface 317 of the adjustment rod 145 is positioned in or through an opening 319 of the first arm 115 when the first lifting apparatus 300 is assembled onto the trough 105. The tool interface 317 may be a portion of the adjustment rod 145 configured to interface with a wrench, a socket, or other tool utilized to rotate the adjustment rod 145. The adjustment rod 145 includes the gear device 321 that translates rotation of the adjustment rod 145 to the rotatable screw 200 to move the bearing block 205 thereon.

The second arm 120 includes a pin connection 232 that couples to a hole 325 formed in a sidewall of the trough 105. The second arm 120 also includes a pin connection 327 that couples to a hole 329 formed in the first arm 115. The second arm 120 further includes a yoke portion 331 having openings 333 that couple to an opening 335 formed in the link member 135 via a pin. The link member 135 includes a yoke portion 337 having openings 339 that couples with a pin extending from the bearing block 225 of the second adjustment device 130B.

FIG. 4 is partial cross sectional view of a portion of the catwalk 100 in the stowed position to aid in explaining the operation of the second adjustment device 130B. One of the first arms 115 is not shown, and the base member 215 as well as the rotatable screw 220 and bearing block 225 are shown in cross-section. The second adjustment device 130B includes the gear device 400 that is fixed to the rotatable screw 220 and a base bearing 405 that are also shown in cross-section. The gear device 400 is operably coupled to the adjustment rod 140 and the bearing block 225 is operably coupled to the rotatable screw 220.

Rotation of the adjustment rod 140 clockwise or counterclockwise as shown by arrow 410 rotates the gear device 400 and the rotatable screw 220 about axis 415, which causes the bearing block 225 to move in the Z-direction within the slot 422. The base bearing 405 couples the second adjustment device 130B to the base member 215. The bearing block 225 is coupled to the link member 135 that rotates about the fourth pivot point 245 (shown in FIG. 2B) as the bearing block 225 is moved in the slot 422. As the fourth pivot point 245 is fixed when the catwalk 100 is in the stowed position, the link member 135 moves in a slight arc 420 as the bearing block 225 is moved. The slot 422 includes curved walls 425 to accommodate for the movement of the link member 135 about the slight arc 420. Additionally, the axis 415 of the rotatable screw 220 may move laterally as indicated by reference arrow 430 as the bearing block 225 is moved in the Z-direction in the slot 422. The bearing block 225 may include a gimbal mechanism 435 to allow the bearing block 225 to move as the rotatable screw 220 moves laterally.

While the foregoing is directed to embodiments of the disclosure, other and further embodiments of the disclosure thus may be devised without departing from the basic scope thereof, and the scope thereof is determined by the claims that follow.

The invention claimed is:

1. A tubular transfer system, comprising:
   a trough coupled between a pair of lift arm assemblies;
   a base member coupled to each of the pair of lift arm assemblies;
   a first adjustment assembly disposed on the pair of lift arm assemblies for adjusting a presentation angle of the trough;
   a second adjustment assembly coupled to the base member and a portion of each of the pair of lift arm assemblies for adjusting a presentation height of the trough; and
   wherein each of the first and the second adjustment assemblies comprise a rotatable screw and a bearing block.

2. The system of claim 1, wherein each of the rotatable screws is coupled to a gear and a rotatable adjustment rod.

3. The system of claim 1, wherein each of the pair of lift arm assemblies comprise:
   a first arm coupled between the base member and a second arm at a first end thereof, a second end of the second arm coupled to the trough; and
   a link member that is coupled to the second arm at first end thereof, a second end of the link member being coupled to the second adjustment assembly.

4. The system of claim 3, wherein the rotatable screw and the bearing block of each of the first adjustment assembly and the second adjustment assembly are disposed on one of the first arms.

5. The system of claim 4, wherein each of the bearing blocks are coupled to a roller shaft movably disposed in a slot formed in the trough.

6. The system of claim 1, further comprising an actuator coupled to the base member and each of the pair of lift arm assemblies.

7. The system of claim 1, wherein the presentation height of the trough is adjustable within a range of about 10 feet.

8. The system of claim 1, wherein the presentation angle of the trough is adjustable within a range of about 12 degrees.

9. A tubular transfer system, comprising:
   a trough coupled between a pair of lift arm assemblies;
   a base member coupled to each of the pair of lift arm assemblies;
   a first adjustment assembly disposed on the pair of lift arm assemblies for adjusting a presentation angle of the trough; and
   a second adjustment assembly coupled to the base member and a portion of each of the pair of lift arm assemblies for adjusting a presentation height of the trough, wherein the presentation height of the trough is adjustable within a range of about 10 feet, wherein the presentation angle of the trough is adjustable within a range of about 12 degrees, and wherein each of the first and the second adjustment assemblies comprise a rotatable screw and a bearing block.

10. The system of claim 9, wherein each of the rotatable screws is coupled to a gear and a rotatable adjustment rod.

11. The system of claim 9, wherein each of the pair of lift arm assemblies comprise:
   a first arm coupled between the base member and a second arm at a first end thereof, a second end of the second arm coupled to the trough; and
   a link member that is coupled to the second arm at first end thereof, a second end of the link member being coupled to the second adjustment assembly.

12. The system of claim 11, wherein the rotatable screw and the bearing block of each of the first adjustment assembly and the second adjustment assembly are disposed on one of the first arms.

13. The system of claim 12, wherein each of the bearing blocks are coupled to a roller shaft movably disposed in a slot formed in the trough.

14. A method for adjusting a tubular transfer system, the method comprising:
   locating a catwalk having a movable trough at a position adjacent to a rig floor;
   adjusting a presentation height and a presentation angle of the movable trough while the catwalk is in a stowed position, wherein adjusting the presentation height and the presentation angle comprises rotating an adjustment rod coupled to a lift arm assembly that moves the movable trough, and rotating a screw during rotation of the adjustment rod; and
   energizing an actuator coupled to the lift arm assembly to move the movable trough from a stowed position to a deployed position.

15. The method of claim 14, wherein the presentation height of the movable trough is adjustable in a range of about 10 feet.

16. The method of claim 14, wherein the presentation angle of the movable trough is adjustable in a range of about 12 degrees.

17. The method of claim 14, wherein adjusting the presentation height and the presentation angle further comprises moving a bearing block disposed on the screw during rotation of the screw.

* * * * *